UNITED STATES PATENT OFFICE.

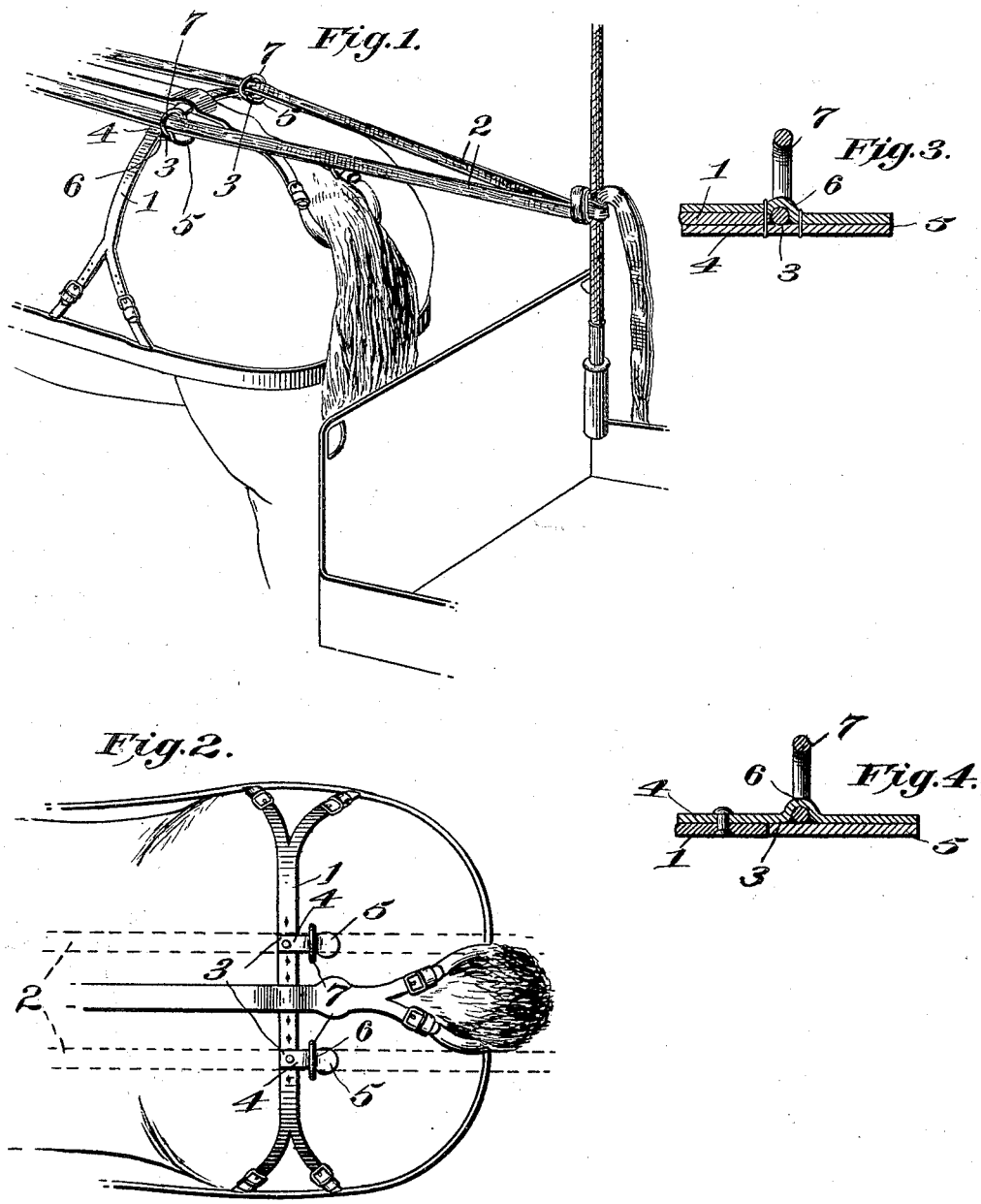

GEORGE W. HINMAN, OF LAKE CHARLES, LOUISIANA.

REIN-GUARD.

SPECIFICATION forming part of Letters Patent No. 695,932, dated March 25, 1902.

Application filed April 18, 1901. Serial No. 56,407. (No model.)

*To all whom it may concern:*

Be it known that I, GEORGE W. HINMAN, a citizen of the United States, residing at Lake Charles, in the parish of Calcasieu and State of Louisiana, have invented certain new and useful Improvements in Rein-Supports; and I do declare the following to be a full, clear, and exact description of the invention, such as will enable others skilled in the art to which it appertains to make and use the same.

The invention relates to rein-supports.

The object of the invention is to provide rein-supports which shall be simple of construction, durable in use, comparatively inexpensive of production, easily attached to the hip-strap of a set of harness, and by the employment of which the reins will be prevented from sagging down along the sides of the animal, hooking under buckles and the ends of straps, or being caught under the horse's tail, thus enabling the driver to have perfect control of the animal, which would not be the case should the reins become entangled with the harness or be caught under the animal's tail.

With this object in view the invention consists in certain novel features of construction and combination of parts which will be hereinafter more fully set forth, and particularly pointed out in the appended claim.

In the accompanying drawings, Figure 1 illustrates in perspective the application of the invention. Fig. 2 is a top plan view showing in outline the body of the horse and illustrating the rein-supports attached to the hip-strap of the harness and the lines passing through the rings of the supports and engaging the protecting circular enlargement. Fig. 3 is a vertical sectional view through one form of one of the rein-supports, and Fig. 4 is a similar view through another form of the rein-supports.

Referring to the drawings, 1 denotes the hip-strap of a set of harness, and 2 the driving-reins.

3 denotes the rein-holders, each of which consists of a strap 4, connected to the hip-strap in any suitable manner and projecting rearwardly therefrom at right angles thereto and formed at its rear end with a circular enlargement 5. This strap is also provided with a loop 6, which receives the guide-rings 7, which when not in use are adapted to lie down around the edge of the circular enlargement. The loop may be formed by attaching a separate piece of leather to the strap, as shown in Fig. 3, or the leather may be slit, as shown in Fig. 4, and the loop then formed. The circular enlargement serves the function of preventing the reins coming in contact with the animal, and thus prevents them from becoming wet when the animal is sweating. The strap of the rein-support may be attached to the hip-strap by sewing, riveting, as shown in Fig. 1, or by forming the hip-strap and rein-support strap with buttonholes to receive a button, as shown in Fig. 2.

By the employment of rein-supports of this character the tendency of the reins to drop down along the sides of the animal and catch or hook under the ends of straps or become entangled with the animal's tail is entirely obviated, so that the driver has complete control of the horse.

When it is not desired to use the guide-ring 7, it may be swung rearwardly and lie around close to the circular edges of the enlargement 5, and thus present a neat appearance and offer no obstruction to the movement of the reins.

From the foregoing description, taken in connection with the accompanying drawings, the construction, operation, and advantages of the invention will be readily understood without requiring an extended explanation. The device is exceedingly useful for the purpose for which it is designed and may be placed upon the market at a comparatively small cost.

Various changes in the form, proportion, and the minor details of construction may be resorted to without departing from the principle or sacrificing any of the advantages of this invention.

Having thus fully described my invention, what I claim as new, and desire to secure by Letters Patent, is—

The combination with the harness, of a rein-support comprising a strap, one end of which is attached to the hip-strap and the other end of which is formed with a flat, circular enlargement, a loop secured to said strap, and a ring loosely hung on said strap and adapted when laid flat to surround the edges of said circular enlargement, substantially as set forth.

In testimony whereof I have hereunto set my hand in presence of two subscribing witnesses.

GEORGE W. HINMAN.

Witnesses:
P. A. BOURG,
A. B. MCCAIN.